April 12, 1949. F. R. WOODARD 2,466,923
GRAIN UNLOADING AND MIXING VEHICLE
Filed March 5, 1946 2 Sheets-Sheet 2
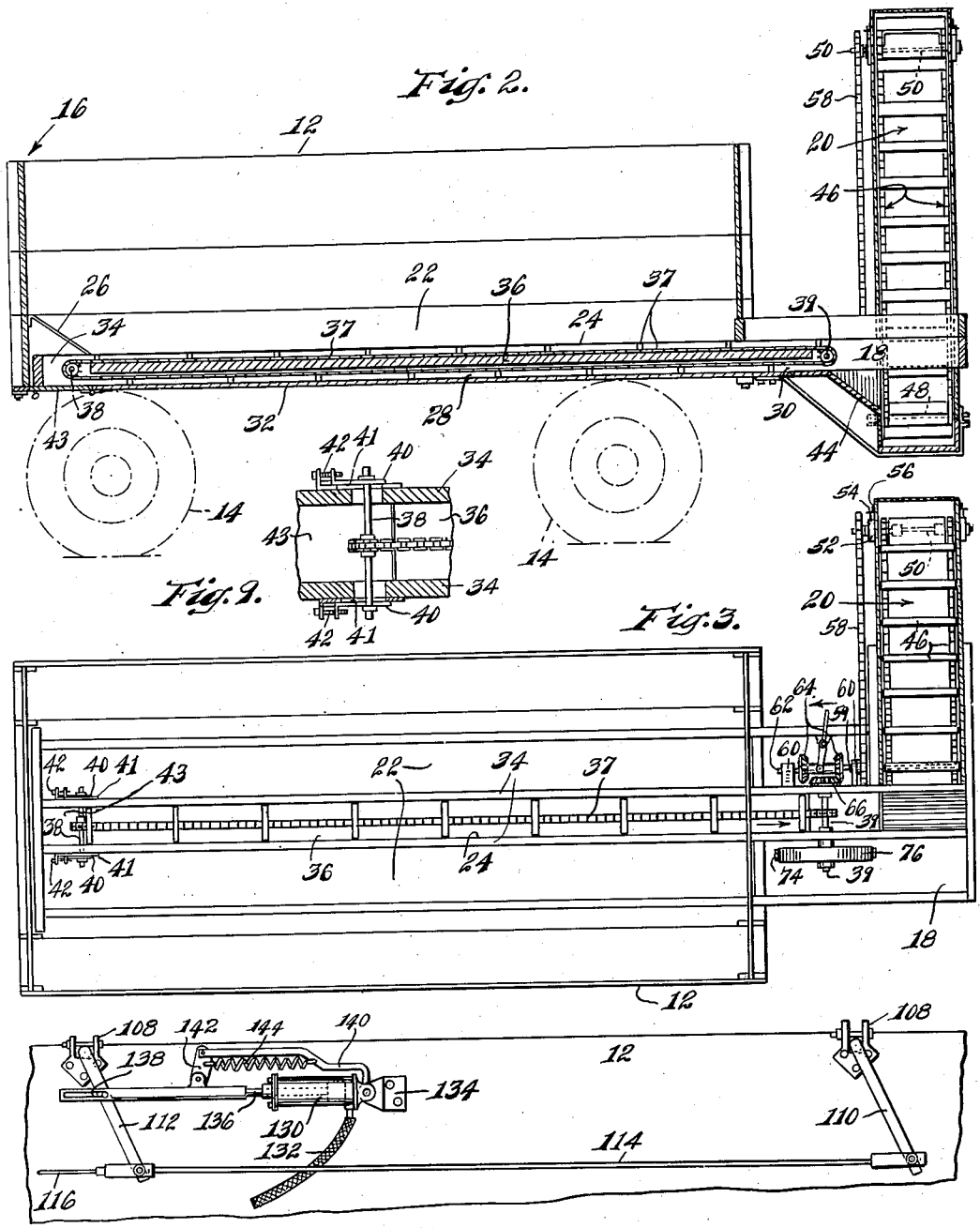
Inventor.
Floyd R. Woodard.
By Bair & Freeman
Attys.

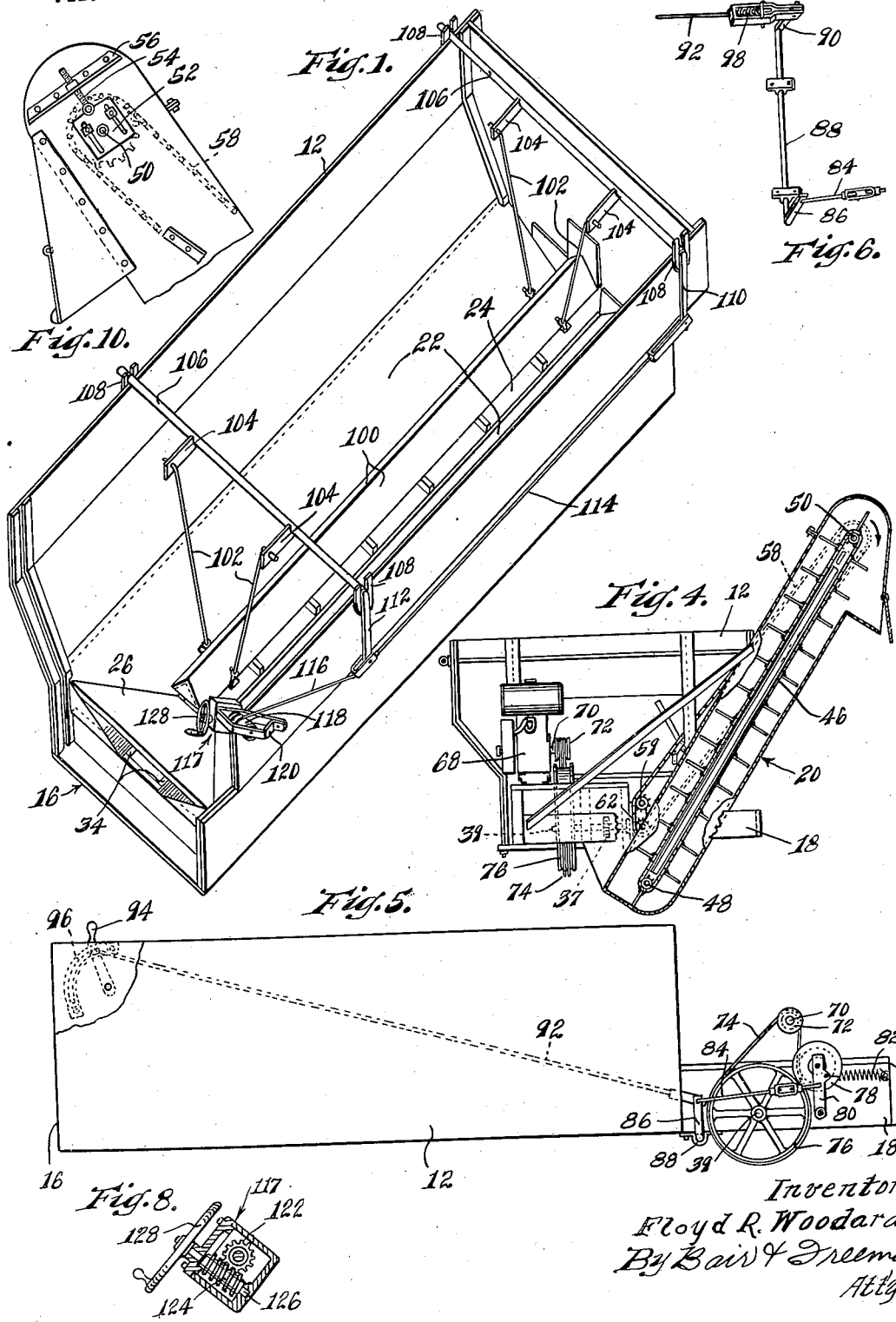

Patented Apr. 12, 1949

2,466,923

UNITED STATES PATENT OFFICE 2,466,923

GRAIN UNLOADING AND MIXING VEHICLE

Floyd Richard Woodard, Webster City, Iowa

Application March 5, 1946, Serial No. 652,136

4 Claims. (Cl. 214—83.16)

This invention relates to grain unloaders and mixers, and particularly to the portable type adapted to a vehicle, such as a wagon.

An object of the invention is that the assembly is adapted to be constructed as an integral part of a vehicle, or it may be fitted to an ordinary wagon or truck of standard design.

Another object of the invention is the provision of a vehicle having an unloading elevator for unloading grain, or other materials into bins, mills or livestock feeders.

Still another object is the provision of a horizontal conveyor for drawing the grain from the interior of the vehicle and discharging it into the elevator.

An additional object of the invention is the provision of means for regulating the rate at which the grain is drawn out. This regulator is in the form of an inverted V-shaped trough positioned above the horizontal conveyor, and is raised and lowered to control the grain being unloaded.

A further object is to provide that the regulator just mentioned is utilized to relieve the horizontal conveyor from the strain of the whole load in the vehicle bearing on it.

A still further object of the invention is the provision of means whereby the operator can control the regulator from the normal operator's position on the vehicle.

An additional object is to provide a hydraulic device for operating the regulator in the event the vehicle is drawn by a tractor when the tractor is provided with hydraulic operating means.

Another object of the invention is the provision of power means carried by the vehicle for driving the unloading and mixing mechanism.

Still another object is to provide means for controlling the power means from the vehicle operator's normal position.

With these and other objects in view, my invention consists in the construction, arrangement, and combination of the various parts of my device, whereby the objects contemplated are attained, as hereinafter more fully set forth, pointed out in my claims, and illustrated in the accompanying drawings, wherein:

Fig. 1 is a perspective view of a wagon box showing the horizontal conveyor for drawing the grain from the wagon, and regulator means for controlling the passage of grain into the conveyor.

Fig. 2 is a longitudinal vertical sectional view of the vehicle;

Fig. 3 is a plan view of the vehicle with the power device removed;

Fig. 4 is an end view from the rear of the vehicle;

Fig. 5 is a side view of a part of the vehicle showing the means for shifting the power means into gear;

Fig. 6 is a perspective view of a rock shaft used in the device shown in Fig. 5.

Fig. 7 is a side view of a part of the vehicle showing a hydraulic means for operating the regulating means for controlling the passage of grain from the wagon box;

Fig. 8 is an enlarged view of the worm gear mechanism shown in Fig. 1;

Fig. 9 is an enlarged view of the chain take-up on the horizontal conveyor shown in Figs. 2 and 3; and Fig. 10 is an enlarged view of the upper end of the elevator.

Referring now in detail to the drawings, I show a vehicle which in this instance is a farm wagon in which the device is more or less built in with the construction of the vehicle. The vehicle may, of course, be a truck if desired. As here shown, the vehicle includes a wagon box 12 mounted on wheels 14, and is provided at its forward end 16 with any standard draft device. A conventional operator's seat is provided also at the forward end 16, but is omitted here for clarity. An extension 18 of the frame on which the wagon box is mounted extends to the rear for supporting an elevator 20. The wagon box 12 is provided at its lower portion with downwardly converging surfaces 22 forming a longitudinal slot or opening 24 in the bottom of the box. In Fig. 1 the end gate at the forward end 16 of the vehicle is removed showing another inclined surface 26 which cooperates with the sides 22 in directing the grain or other material in the wagon box to the opening 24. This inclined surface 26 is omitted from Fig. 3 to show more clearly the operating parts in the wagon. Formed in the wagon construction below the opening 24 is a channel 28 running the full length of the vehicle and extending to the rear thereof as indicated at 30. This channel 28 includes a strip 32 on the bottom, and vertically extending side pieces 34 on either side of the channel completing the enclosure thereof. Supported in the channel is a horizontally disposed partition or bearing surface 36 secured to the side pieces 34 and extending from in front of the lower edge of the inclined surface 26 rearwardly to and beyond the rear end 30 of the channel. A horizontal conveyor 37 is positioned in the channel 28 with one run above the partition 36, and its return run below the partition. The conveyor 37 is secured in place on sprockets mounted on shafts 38 and 39 which are also supported by the side pieces. Fig. 9 shows a means for taking up the chain on the conveyor 37. The shaft 38 is journalled in side plates 40 which are mounted on fixed brackets 41 which in turn are mounted on the side pieces 34. The shaft 38 is adjustable longitudinally by adjusting bolts 42 cooperating between side plates 40 and fixed brackets 41. At the forward end of the strip 32 is a door 43 for clearing out small quantities of grain that may accidentally fall under the inclined surface 26, and for gaining access to the forward end of the horizontal conveyor 37.

Communicating with the rear end 30 of the channel 28 is a hopper 44 which slopes downwardly to the rear and opens into the lower end of the elevator 20. The elevator 20 is provided with the usual conveyor 46 supported and operated by a lower shaft 48 and an upper shaft 50. Reference to Fig. 10 will show a means for tightening the conveyor 46 of the elevator 20. This tightening means includes side plates 52 in which the shaft 50 is mounted and bolts 54 with eyelets therein secured to the side plates 52, the bolts 54 extending through brackets 56 mounted on the elevator frame and adjusted by nuts threaded on the bolts.

The elevator 20 is driven by a chain 58 trained over sprockets, one of which is on the shaft 50 and the other on shaft 62 which is journaled in a bracket 60 secured to the frame 18 of the vehicle. Journaled in the bracket 60 is a stub shaft 59, positioned above the shaft 62, and provided with a sprocket over which the chain 58 is also trained. The stub shaft 59 is adjustably mounted in the bracket 60 for serving as a tightener for the chain 58, in a well known manner. When the conveyor 46 is to be tightened, the stub shaft 59 is released, the conveyor is tightened by adjusting it at the upper end, and the shaft 59 again tightened. Two beveled gears 64 are fixed on the shaft 62 and are adapted to alternately mesh with bevel gear 66 secured to the shaft 39 which was referred to in connection with the horizontal conveyor 37. Conventional means is provided for shifting one or the other of the gears 64 into engagement with gear 66 for reversing the direction of travel of the conveyor 46 in the elevator.

In the embodiment illustrated I have shown a power means built in with the construction of the vehicle. This power means is shown in Fig. 4 and consists of a standard gasoline engine 68 mounted on the frame 18 and having a shaft 70 with a pulley 72 secured thereto. A belt 74 engages the pulley 72 and another pulley 76 secured to the shaft 39. The belt 74 is normally slack over the pulleys and is adapted to be brought into tightened engagement therewith. Operation of the shaft 39, it will be seen, will operate both the horizontal conveyor 37 and the conveyor 46 of the elevator 20.

The device for shifting the power means 68 into and out of gear is shown in Figs. 5 and 6. A belt tightener pulley 78 is rotatably mounted on an arm 80 which is mounted on the frame 18 and is biased out of engagement with the belt 74 by a spring 82 secured to the frame 18. A link 84 has one end secured to the arm 80 and the other end to crank arm 86 on one end of the rock shaft 88. The rock shaft 88 extends transversely across the vehicle under the frame 18 and is provided on its opposite end with a second crank arm 90.

A link 92 extends to the forward end of the vehicle and is attached to an operating lever 94 pivoted on the wagon box. The lever 94 has latching engagement with a quadrant 96 which is also secured to the wagon box for latching the lever in different positions. The connection of the link 92 with the crank arm 90 includes a compression spring 98 reacting between the link 92 and the crank arm 90. Actuation of the lever 94 forward, operates to bring the belt tightener 78 into engagement with the belt 74.

From the description thus far it will be seen that the vehicle includes a means for drawing the grain from the wagon box, dumping it into an elevator, and elevating it to the dumping point. It is desirable to have a control for regulating the rate at which the grain will be unloaded, aside from the speed of the conveyors. Referring now to Fig. 1, I have provided a cover means 100 for the opening 24 in the bottom of the wagon box. The cover means consists of an inverted V-shape device which fits over the opening and rests on the side pieces 34 of the channel 28 when in its lowered position. The cover means 100 is connected at four points by links 102 which are connected at their other ends to crank arms 104 secured to rock shafts 106. The rock shafts are supported on the upper edges of the wagon box in U-shaped brackets 108. The rock shafts 106 are provided at one end thereof with crank arms 110 and 112 extending downwardly and interconnected at their free ends by link 114 which runs along the side of the wagon box. At the point where the forward end of the link 114 is connected with the crank arm 112, a flexible cable 116 is secured. This flexible cable is connected with a worm gear device indicated generally at 117 (see also Fig. 8). The worm gear device includes a drum 118 journaled in a bracket 120 supported on the wagon box, and is provided with a worm gear 122 cooperating with worm 124. The worm shaft 126 is provided with a crank wheel 128 upon cranking of which, the flexible cable 116 can be drawn up rotating the crank shafts 106 and elevating the cover means 100. The cover means 100, being an inverted V-shaped device, can be drawn upwardly through the mass of grain which is in the wagon box in spite of the weight of the grain. The extent to which the cover means 100 is raised determines the rate at which the grain from the wagon box passes into the conveyor 37 and is withdrawn thereby. This cover means 100 also serves the purpose of preventing the weight of the grain in the wagon box from resting on the conveyor 37, which would impose too great a load and strain on the conveyor.

In Fig. 7, I have shown an alternative means for operating the crank shafts 106 and thereby the cover means 100. It consists of a hydraulically operated device adapted to be connected with the hydraulic power take-off on a tractor, when the vehicle is drawn by a tractor having such a type of power. The device includes a hydraulic cylinder 130 having a flexible hose connection 132 which may be connected with the hydraulic power take-off on the tractor. The hydraulic cylinder is pivotally connected to a bracket 134 on the side of the wagon box. The cylinder 130 is provided with a piston rod 136 having a longitudinal slot 138 in the outer end thereof for slidingly receiving a pin secured on the crank arm 112. When the piston 136 is extended it rotates the crank arm 112 and operates to raise the cover means 100. An arm 140 is provided with one end connected at the point of connection between the cylinder 130 and the bracket 134, and extends forwardly where its opposite end is pivotally secured to a link 142. The link 142 is pivotally secured at its opposite end on the piston 136. A tension spring 144 is connected between the ends of the link 142 and a point rearwardly on the arm 140, for retracting the piston 136 and lowering the cover means 100.

The cover means 100 can therefore be operated by either the hydraulic cylinder 130 or the crank wheel 128 independently of the other, and without interference by the other. When the crank wheel 128 is operated drawing the crank arm 112 forward the pin in the crank arm slides in the slot 138 without having any effect on the piston 136; and when the crank arm 112 is operated forwardly by the cylinder 130, the flexible cable 116 slackens, eliminating any interference with the worm gear drive.

The device is also adapted for a mechanical power take-off connection with a tractor or other power draft implement for operating the conveyors 37 and 46. The shaft 62, which drives the chain 58 on the elevator, can be extended forwardly to a point beyond the front of the vehicle where it can be connected with the power take-off connection of the tractor. In thus adapting the operating mechanism for power take-off connection, suitable holes are formed in the frame 18 below the inclined surface 22 on that side of the vehicle for extending the shaft 62 therethrough. With such connection the power means 68 can be eliminated from the assembly.

The foregoing description has emphasized the unloading feature of the invention. The invention is as well adapted for mixing, which takes place as a normal function in the unloading operation. For example, if various kinds of grain, such as corn, oats and barley are put into the wagon box and placed, as much as can be, side by side longitudinally of the box, the total mass of grain will be withdrawn from the wagon box in a mixture made up of some of each of the different kinds of grain. The mixing operation continues as the grain tumbles down the hopper 44 into the elevator 20, and out of the elevator into bins or feeders. This device has proved very effective for mixing different kinds of grain.

While I have referred to grain throughout the specification as being the contents of this device, it is, of course, obvious that the device may be used for other items as well.

Although I have herein shown and described a preferred embodiment of my invention, manifestly it is susceptible of modification and rearrangement of parts without departing from the spirit and scope thereof. I do not, therefore, wish to be understood as limiting this invention to the precise form herein disclosed, except as I may be so limited by the appended claims.

I claim as follows:

1. In a construction of the class described, a container for grain, the lower portion of the container converging downwardly forming an elongated opening for the passage of grain therethrough, single rigid cover means positioned over the opening for closing the opening, said cover means being bodily movable vertically and being biased downwardly by the weight of the grain in the container, rock shafts having arms extending therefrom mounted on the top of the container, links for supporting said cover means from the free ends of said arms, and means for rocking the rock shafts for raising and lowering the cover means.

2. In a construction of the class described, a container for grain, the lower portion of the container converging downwardly forming an elongated opening for the passage of grain therethrough, vertically movable cover means positioned over the opening for closing the opening, a pair of rock shafts mounted on the top of the container, each of the rock shafts having a pair of arms extending therefrom, links for supporting said cover means from the free ends of said arms, crank arms secured on one end of the rock shafts, link means interconnecting the free ends of the crank arms, and worm gear means operating through the last named link means for rocking the rock shafts.

3. A construction of the class described, comprising, in combination, a rectangular container for grain, the lower portion of the container converging downwardly forming an elongated opening for the passage of grain therethrough, inverted V-shape, rigidly constructed cover means for the opening, said cover means being positioned in the interior of the container under the quantity of grain when the container is full, said cover means being biased downwardly under the weight of the grain, and means for raising the cover means from the opening.

4. In a portable grain unloader and mixer adapted to be drawn by draft animals or by an implement having a hydraulic power take-off device, the combination of a container for grain having an opening in the bottom thereof for the passage of grain therethrough, cover means positioned in the container over the opening and adapted to be raised off the opening and lowered thereonto, operating means mounted on the top of the container for raising and lowering the cover means, and manual means and hydraulic means connected with the operating means for operating the same, the manual means and the hydraulic means each being operable without interference from the other, and said hydraulic means adapted to be connected with the hydraulic power take-off device on the draft implement.

FLOYD RICHARD WOODARD.

REFERENCES CITED

The following references are of record in the file of this patent:

UNITED STATES PATENTS

| Number | Name | Date |
|---|---|---|
| 1,497,622 | Webster | June 10, 1924 |
| 1,515,327 | Barkmann et al. | Nov. 11, 1924 |
| 1,921,959 | Warren | Aug. 8, 1933 |
| 2,107,682 | Wall | Feb. 8, 1938 |
| 2,347,522 | Stinnett | Apr. 25, 1944 |
| 2,393,849 | Werts | Jan. 29, 1946 |
| 2,411,056 | Ricketts | Nov. 12, 1946 |
| 2,412,121 | Bradshaw | Dec. 3, 1946 |
| 2,422,268 | Symonds | June 17, 1947 |
| 2,431,000 | Step | Nov. 18, 1947 |